United States Patent [19]

Tanaka

[11] Patent Number: 5,331,668
[45] Date of Patent: Jul. 19, 1994

[54] COMMUNICATION CONTROL DEVICE
[75] Inventor: Koichi Tanaka, Kawasaki, Japan
[73] Assignee: Kabushiki Kaisha Toshiba, Kawasaki, Japan
[21] Appl. No.: 543
[22] Filed: Jan. 4, 1993

Related U.S. Application Data

[63] Continuation of Ser. No. 578,457, Sep. 7, 1990, abandoned.

[30] Foreign Application Priority Data

Sep. 7, 1989 [JP] Japan .................................. 1-230319

[51] Int. Cl.⁵ .............................................. H04L 7/00
[52] U.S. Cl. ..................................... 375/116; 370/105.4
[58] Field of Search ............... 375/106, 114, 116, 118, 375/119; 370/100, 105.4, 105.5, 106, 107; 371/42, 46; 340/825.2, 825.14

[56] References Cited

U.S. PATENT DOCUMENTS

| | | | |
|---|---|---|---|
| 4,748,623 | 5/1988 | Fujimoto | 375/116 |
| 4,768,192 | 8/1988 | Pattavina et al. | 375/116 |
| 4,802,192 | 1/1989 | Eto et al. | 370/106 |
| 4,920,546 | 4/1990 | Iguchi et al. | 340/825.2 |
| 4,984,238 | 1/1991 | Watanabe et al. | 370/105.4 |

FOREIGN PATENT DOCUMENTS 249935 12/1987 European Pat. Off. .
60-187148 9/1985 Japan .

OTHER PUBLICATIONS

*IBM Technical Disclosure Bulletin*, "Differential Manchester decoder requiring low speed system clock", vol. 31, No. 10, Mar. 1989, pp. 100–103.

*Primary Examiner*—Stephen Chin
*Attorney, Agent, or Firm*—Foley & Lardner

[57] ABSTRACT

Disclosed is a communication control device in which a clock frequency for processing communication data is the same as or lower than the transfer speed of the communication data without requiring a complicated construction of the input-output portion to the network so as to make it possible to realize low power consumption and easy design and manufacture of the device.

14 Claims, 19 Drawing Sheets

FIG.6
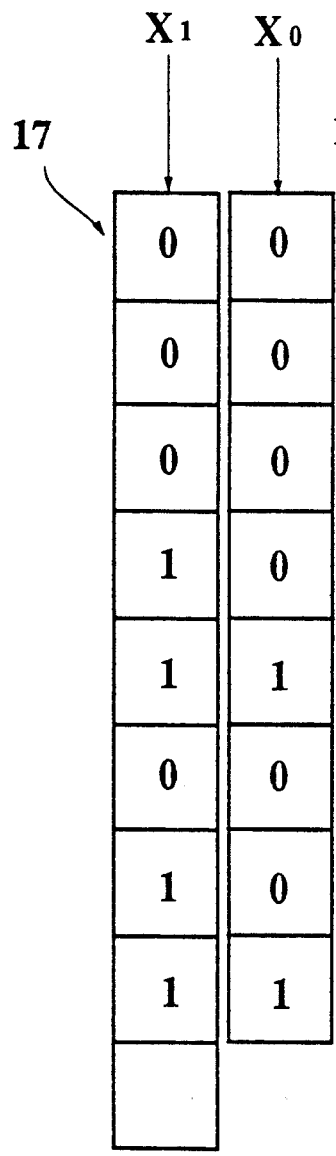
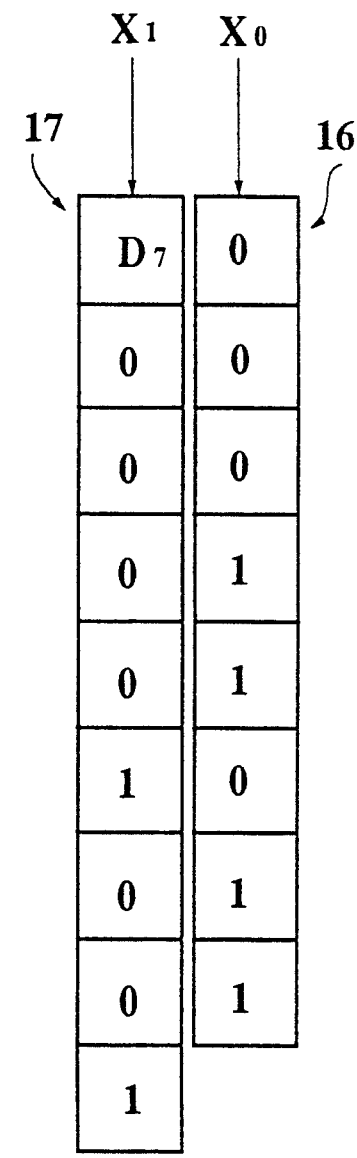

| OUTPUT MODE | DT7 | DT6 | DT5 | DT4 | DT3 | DT2 | DT1 | DT0 |
|---|---|---|---|---|---|---|---|---|
| 1 | Y1 | Y3 | Y5 | Y7 | Y9 | Y11 | Y13 | Y15 |
| 0 | Y0 | Y2 | Y4 | Y6 | Y8 | Y10 | Y12 | Y14 |

| OUTPUT MODE | CV7 | CV6 | CV5 | CV4 | CV3 | CV2 | CV1 | CV0 |
|---|---|---|---|---|---|---|---|---|
| 1 | Y2 | Y4 | Y6 | Y8 | Y10 | Y12 | Y14 | Y16 |
| 0 | Y1 | Y3 | Y5 | Y7 | Y9 | Y11 | Y13 | Y15 |

S (SELECT SIGNAL)

FIG.14
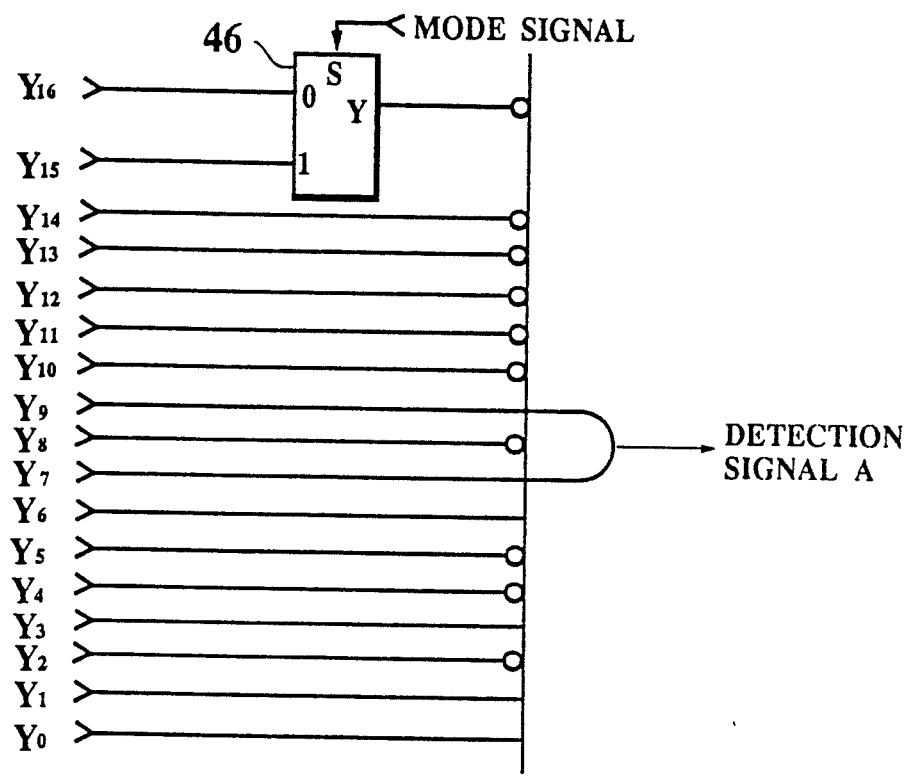
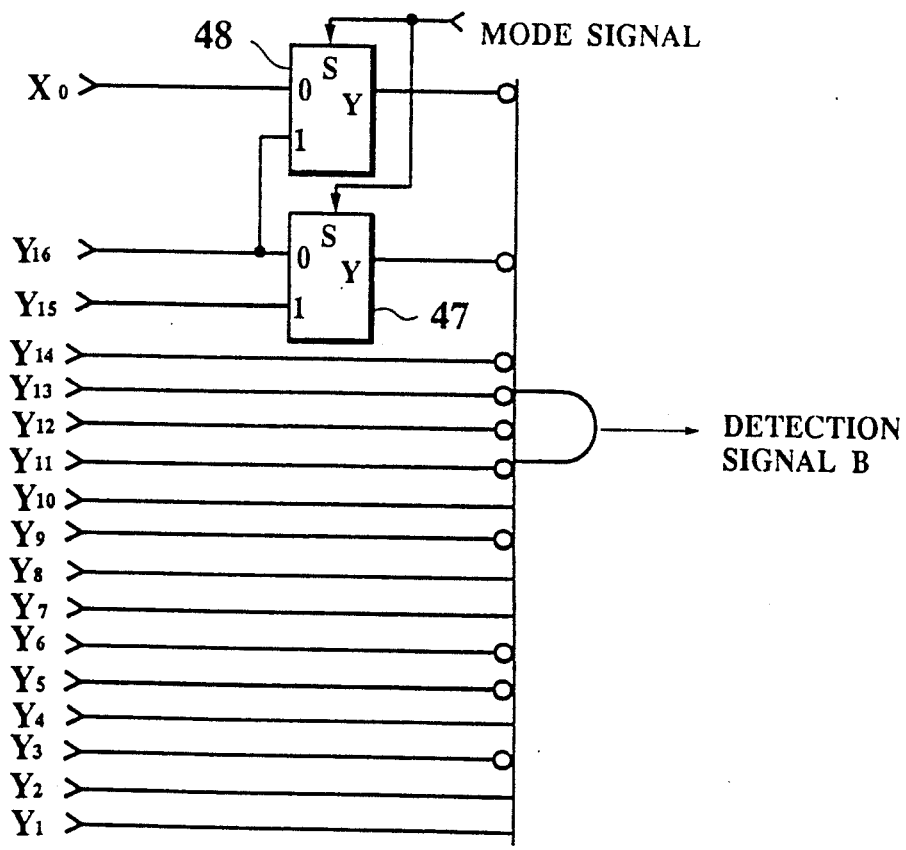

FIG.15

| MODE SIGNAL BEFORE SD IS DETECTED | SD DETECTION SIGNAL OF LEVEL "1" | RESULT OF JUDGEMENT | INITIAL VALUE OF TIMING SIGNAL |
|---|---|---|---|
| "1" | SD DETECTION A | "0" | "001" |
|  | SD DETECTION B | "1" | "000" |
| "0" | SD DETECTION A | "1" | "000" |
|  | SD DETECTION B | "0" | "000" |

COMMUNICATION CONTROL DEVICE

This application is a continuation of application Ser. No. 07/578,457, filed Sep. 7, 1990, now abandoned.

BACKGROUND OF THE INVENTION

1. Field of the Invention

This invention relates to a communication control device for carrying out serial data transmission and reception with a communication network, and particularly to a communication control device which can realize high speed operation in a high-speed local area network.

2. Description of the Prior Art

Recently, high-speed data transmission in an LAN (Local Area Network) has been studied. Particularly, the high-speed data transmission in the LAN by the so-called token ring method which is standardized in IEEE 802.5 is now noted.

As communication data used in the token ring method, the so-called differential Manchester codes (DM codes) are used. In the system of the codes, a time interval which is required for transferring data as a unit of information is divided into two parts as shown in FIG. 1. The signal level of the former half part of the time interval is compared with that of the latter half part of the previous time interval thereof, and the signal level of the latter half part of the time interval is compared with that of the former half part thereof. In FIG. 1, four states of combination of inversion and non-inversion of the former half part and the latter half part of the time interval are shown with respect to each state (H level or L level) of the latter half part of the previous time interval. These states are called "J", "K", "1", "0" respectively as shown in FIG. 1. In this case, when inversion is denoted by "1" and non-inversion is denoted by "0", the DM codes "J", "K", "1", "0" are expressed as "11", "01", "10", "00" respectively. These new codes respectively comprising a combination of the two binary bits are called ER codes. Herein, the lower bit of each of the ER codes is called a code violation bit, and the higher bit thereof is called a data bit.

In communication data in which each unit of information is serial as shown in FIG. 1, no discriminating factor for showing a boundary between serial two units of information is included in each of the units. Therefore, it is very likely that two bits comprising the latter half part of the previous unit of information and the former half part of a unit of information are recognized to be one unit of information. To prevent this problem, a start code of data or a discrimination code of boundary expressed by "JKOJKOOO" comprising the DM codes is used as a start delimiter (SD), and the units of information starts from this code by two bits.

For example, as shown in FIG. 2, there is a terminal of a conventional LAN system based on the token ring method in which such DM codes are used.

In FIG. 2, a media interface 1 is mainly composed of an analog circuit, and regenerates reception data having some logic level from a weak input signal given by a network, and also extracts a reception clock signal overlapping in the input signal. The reception data regenerated by the media interface 1 are converted into reception information by a network control device 2 in synchronism with the reception clock signal extracted, then the reception information is given to a data processing device 3.

Moreover, the data processing device 3 generates transmission information. Then, the transmission information is given to the network control device 2, and converted into transmission data thereby. The transmission data are further converted into an analog output signal by the media interface 1, thereafter the output signal is outputted to the network, and transmitted therefrom.

In such construction, the communication data are transferred on the network as bits arranged in series, and transmitted or received through the media interface 1. Therefore, between the media interface 1 and the network control device 2, the transmission data or the reception data are serially transferred by one bit through a transmission data line 4 or a reception data line 5. Moreover, through another reception clock line 6, the reception clock signal is given to the network control device 2 from the media interface 1.

Accordingly, one unit of information of transmission data expressed by the DM code as described above is processed as the ER code comprising two bits, and the ER code is serially transferred by one bit through the transmission data line 4 or the reception data line 5 so as to be processed by one bit. Namely, the transmission data or the reception data must be recognized and processed by the media interface 1 and the network control device 2 not by one DM code but by one bit. However, the reception signal must have a frequency which is synchronous to one bit and is twice as high as the transfer speed of one unit of information.

As mentioned above, in the conventional LAN system based on the token ring method in which the DM code is used, it is necessary that the clock signal has a frequency twice as high as the transfer speed of communication data.

Therefore, when the transfer speed of the communication data becomes higher, a circuit included in the system for generating the clock signal must generate a clock signal having a higher frequency, so that the circuit must be operated at a higher speed. However, when the operation speed becomes high, the power consumption is inevitably increased. Moreover, by the increase of power consumption, a large-scale power source and system construction capable of heat radiation must be required. Accordingly, it is difficult to realize a small-scale system by the conventional method.

Moreover, to realize the high-speed operation, it is necessary to compose the circuit more finely. Moreover, the delay time on transmitting signals must be more reduced. As the result, the circuit design and layout design for the communication control device and the manufacture thereof become very difficult.

SUMMARY OF THE INVENTION

The present invention was invented in the light of these problems of the prior art, therefore it is an object thereof to provide a communication control device in which a clock frequency for processing communication data is the same as or lower than the transfer speed of the communication data without requiring specially complicated construction of the input-output portion to the network so as to make it possible to realize low power consumption and easy design and manufacture.

To achieve the object, the present invention is characterized by a communication control device for transmitting or receiving communication data composed of a serial row of bits with a communication network through input-output means under control of control means, which comprises converting means for separating the communication data composed of a constant serial row of bits given from the communication network every n bits in order of input to form new data composed of parallel rows of n bits;

clock generating means for generating a clock signal which is synchronous to the data composed of parallel rows of n bits;

control means having a holding portion for successively taking in and holding the data composed of parallel rows of n bits in synchronism with the clock signal generated by the clock generating means, a discriminating portion which compares a plurality of units of the data composed of parallel rows of n bits held by the holding portion with data start discriminating information, and discriminates start of data when some of the units of the data accord with the data start discriminating information, and an extracting and selecting portion for extracting and selecting data from the data composed of parallel rows of n bits held by the holding portion and following the unit of the data which accords with the data start discriminating information.

In this construction, the communication data composed of a serial row of bits from the communication network are converted into data composed of parallel rows of a plurality of bits, and the data composed of parallel rows of a plurality of bits are taken in and held in accordance with the reception constant clock signal which is synchronous to the data composed of parallel rows of a plurality of bits, then the plurality of units of the data composed of parallel rows of a plurality of bits held are compared with the data start discriminating information so as to discriminate start of data, thereafter data to be processed by the network control device 2 are extracted and selected. Accordingly, the frequency of the reception clock signal as a timing for carrying out process of the communication data can be reduced as compared with that of the prior art by converting the serial data into the data composed of parallel rows of a predetermined number of bits.

These and other objects, features and advantages of the present invention will be more apparent from the following description of a preferred embodiment, taken in conjunction with the accompanying drawings.

BRIEF DESCRIPTION OF THE DRAWINGS

FIG. 6 is a diagram to explain operation of an alignment circuit shown in FIG. 3;

FIGS. 14 and 16 are diagrams to show a main part of the circuit shown in FIG. 13;

FIG. 15 is a diagram to explain operation of the main part shown in FIG. 13;

DETAILED DESCRIPTION OF THE EMBODIMENTS

Figure 1:
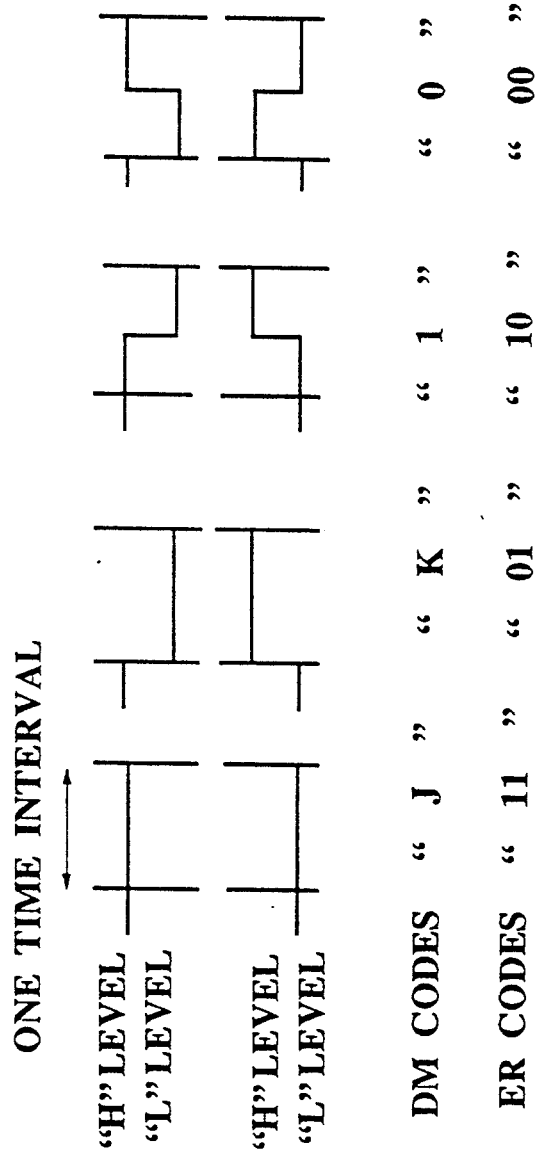
FIG. 1 is a diagram to show forms of communication data in an LAN system.
Figure 2:
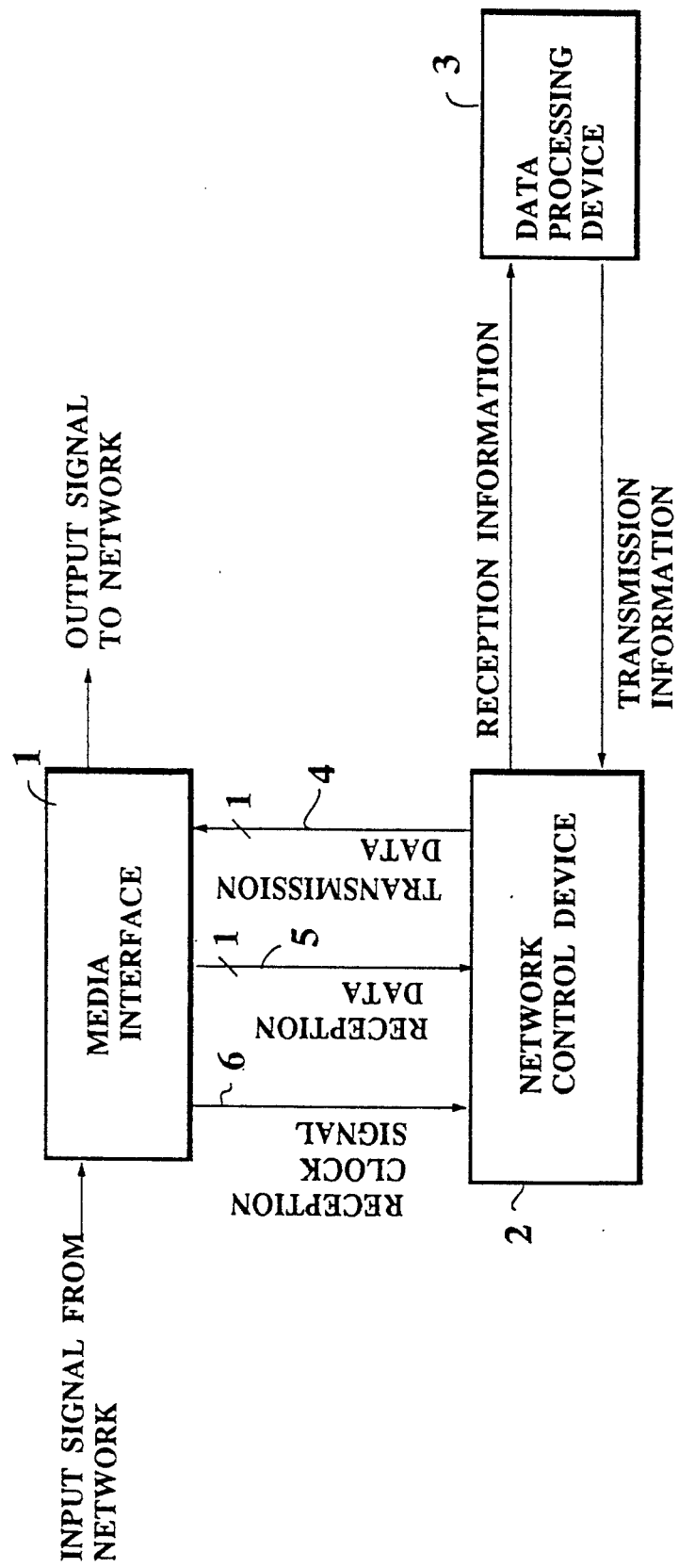
FIG. 2 is a diagram to show construction of a main part in a conventional LAN system.
Figure 3:
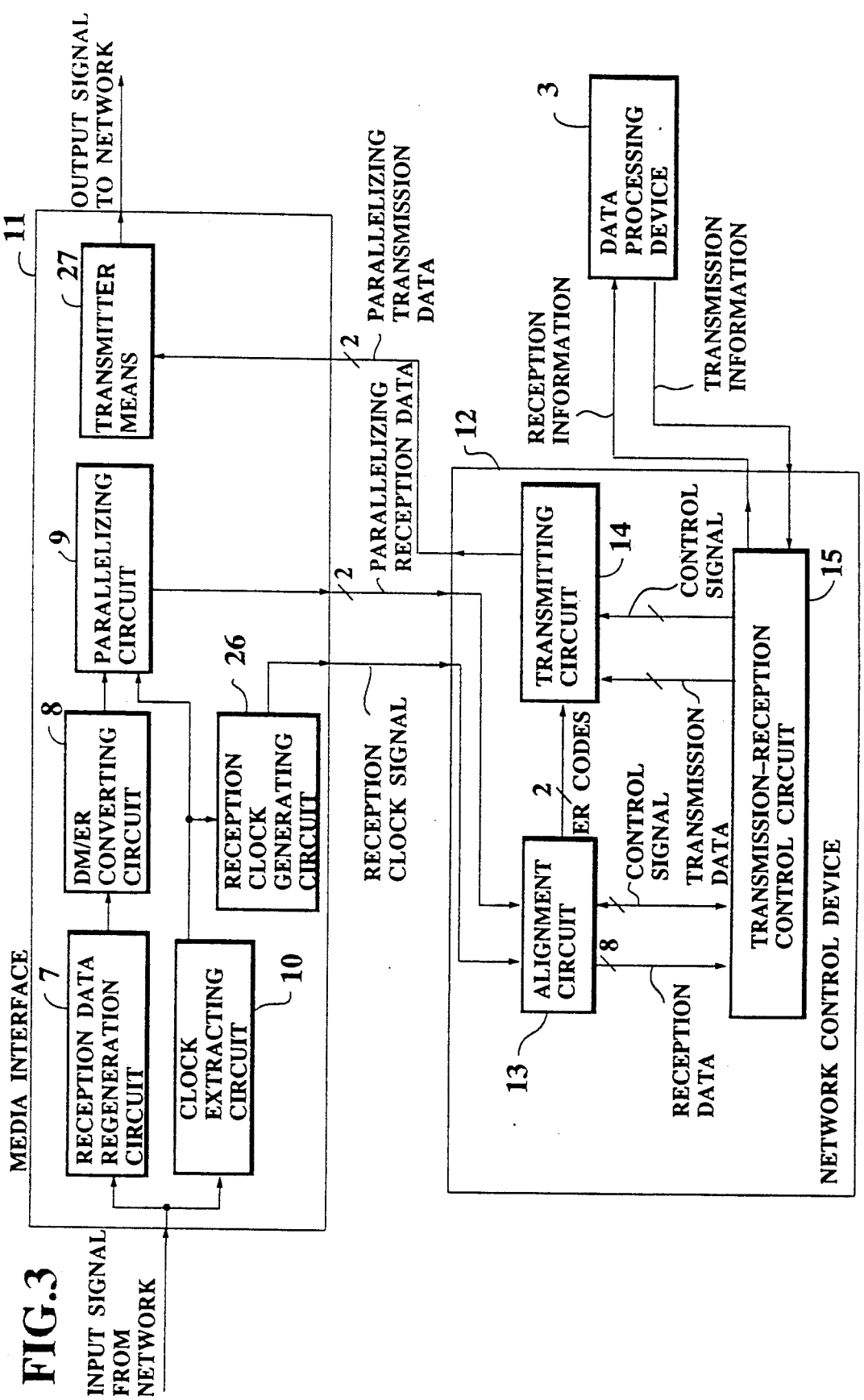
FIG. 3 is a diagram to show construction of a communication system in which a communication control device related to an embodiment of the present invention is used.

FIG. 3 is a diagram to show construction of a system in which a communication control device related to an embodiment of the present invention is used. The embodiment shown in the same drawing is a system in which communication data are transmitted and received between a network and a data processing device 3 through a media interface 11 and a network control device 12 in the same manner as shown in the prior art. This embodiment is characterized in that the ER code as one unit of information composing communication data comprises two bits to be transmitted or received parallel to each other between the media interface 11 and the network control device 12, and the start delimiter is detected in the network control device 12. Incidentally, in FIG. 3, parts or portions designated by the same reference numerals or characters have the same functions respectively as those shown in FIG. 2, thus the explanation on them is omitted.

In FIG. 3, the media interface 11 is arranged between the network and the network control device 12 (hereinafter, it is called NC device).

The media interface 11 has a reception data regeneration circuit 7 for converting a weak network input signal from the network into data comprising DM codes of a logic level, a DM/ER converting circuit 8 for decoding the data comprising DM codes from the reception data regeneration circuit 7 and forming serial data comprising ER codes each of which is composed of two bits, and a parallelizing circuit 9 for parallelizing the serial data comprising ER codes to form parallelized reception data. Accordingly, the DM codes composing the input signal given from the network are decoded and converted into the serial ER codes each of which comprises two bits. Then, the serial ER codes are parallelized by two bits comprising a higher bit X0 and a lower bit X1 to form the parallelized reception data, thereafter the resultant parallelized reception data are transmitted from the media interface 11 to the NC device 12.

Moreover, the media interface 11 has a clock extracting circuit 10 which extracts a constant clock signal overlapping on the network input signal and generates a constant serial clock (which corresponds to the reception clock signal of the prior art shown in FIG. 2) synchronous to the serial data of the ER codes from the DM/ER converting circuit 8, and a reception clock generating circuit 26 for generating a constant reception clock signal synchronous to the parallelized reception data from the parallelizing circuit 9 in accordance with the constant serial clock from the clock extracting circuit 10. Accordingly, since it becomes possible to carry out reception of one DM codes every one clock due to the reception data parallelized by two bits, the frequency of the reception clock signal is the same as that of the DM code. Namely, the frequency of the reception clock signal outputted from the media interface 11 of this embodiment is a half of that of the reception clock signal outputted from the media interface 1 to the NC device 2 in the prior art shown in FIG. 2.

Additionally, the media interface 11 has a transmitter 27 for converting parallelized transmission data comprising the ER codes each of which is composed of two bits given from the NC device 12 into the DM codes, and transmitting the DM codes as a network output signal to the network.

Figure 4:
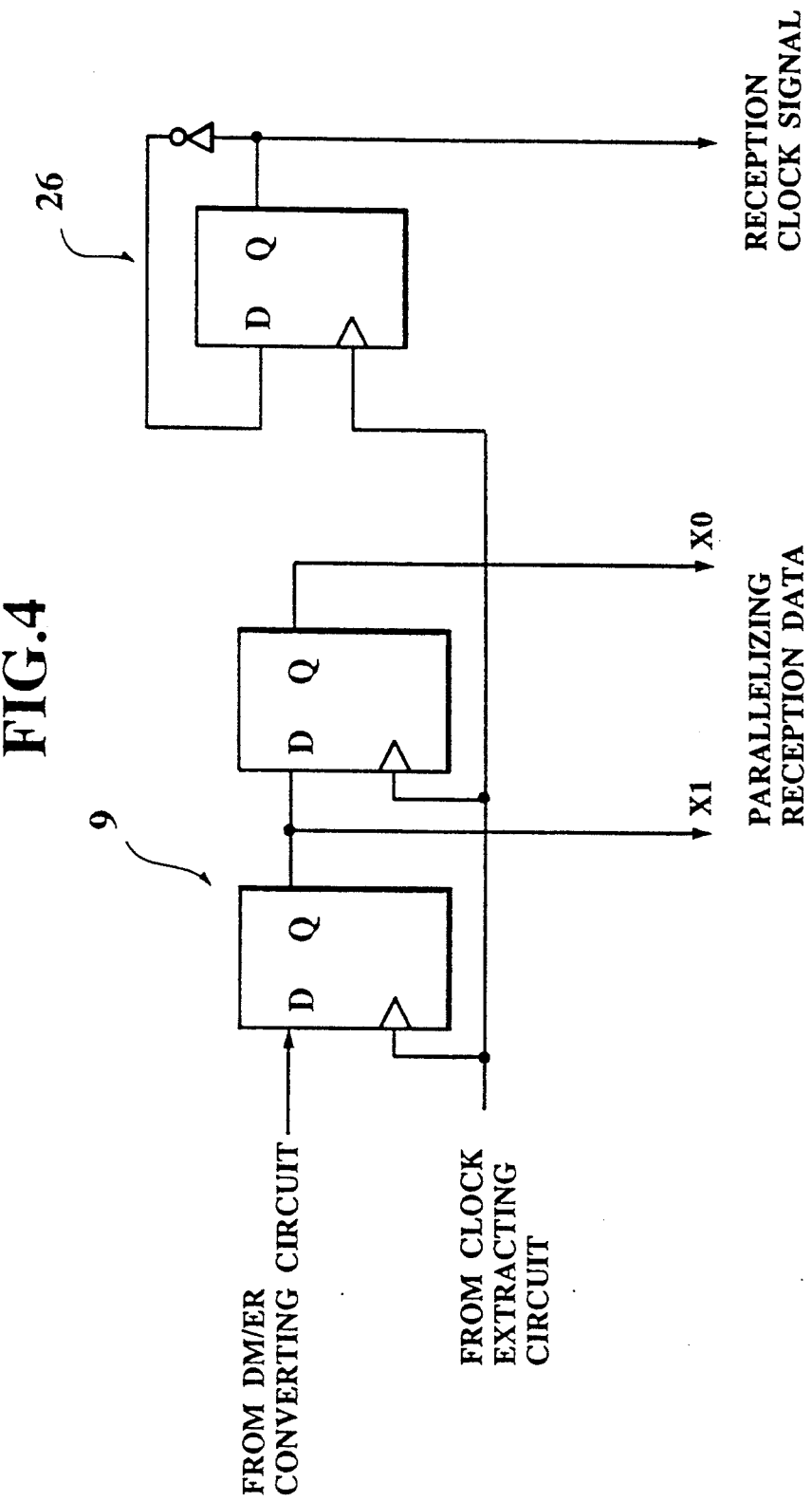
FIGS. 4, 5, 7 and 9 are diagrams to respectively show fundamental construction of a main part in the device shown in FIG. 3.

For example, the parallelizing circuit 9 and the reception clock generating circuit 26 of the media interface 11 are a two-bit shift register 9 and an ½ divider 26 respectively as shown in FIG. 4.

The NC device 12 controls the input-output of data between the media interface 11 and the data processing device 3, and has an alignment circuit 13, a transmitting circuit 14 and a transmission-reception control circuit 15.

The alignment circuit 13 receives the parallelized reception data and the constant reception clock signal from the media interface 11, and detects start delimiter (SD) from the parallelized reception data in synchronism with the constant reception clock signal. Moreover, the alignment circuit 13 gives the ER codes aligned after the SD to the transmitting circuit 14, further obtains reception data comprising eight units of information each unit of which is corresponding to one ER code of two bits, and gives the reception data to the transmission-reception control circuit 15.

Moreover the alignment circuit 13 generates a detection timing signal of SD and a timing signal for showing boundaries of the reception data, and gives these signals to the transmission-reception control circuit 15. These operations of the alignment circuit 13 are carried out in synchronism with the reception clock signal given from the media interface 11.

The transmitting circuit 14 converts the transmission data given from the transmission-reception control circuit 15 into the ER codes, and transmits either of the ER codes converted and the ER codes given from the alignment circuit 13 to the media interface 11 in accordance with a control signal given from the transmission-reception control circuit 15.

The transmission-reception control circuit 15 extracts reception information to be given from a reception frame comprising reception data given from the alignment circuit 13 to the data processing device 3, and composes a transmission frame with transmission information given from the data processing device 3, further carries out the so-called protocol procedure to control operations of the alignment circuit 13 and the transmitting circuit 14.

Next, a concrete construction of the alignment circuit 13 for detecting SD and obtaining the reception data from the parallelized reception data comprising the ER codes in accordance with the reception clock signal which is the feature of the present invention and has the same frequency as that of the DM codes will be explained with reference to FIG. 5.

Figure 5:
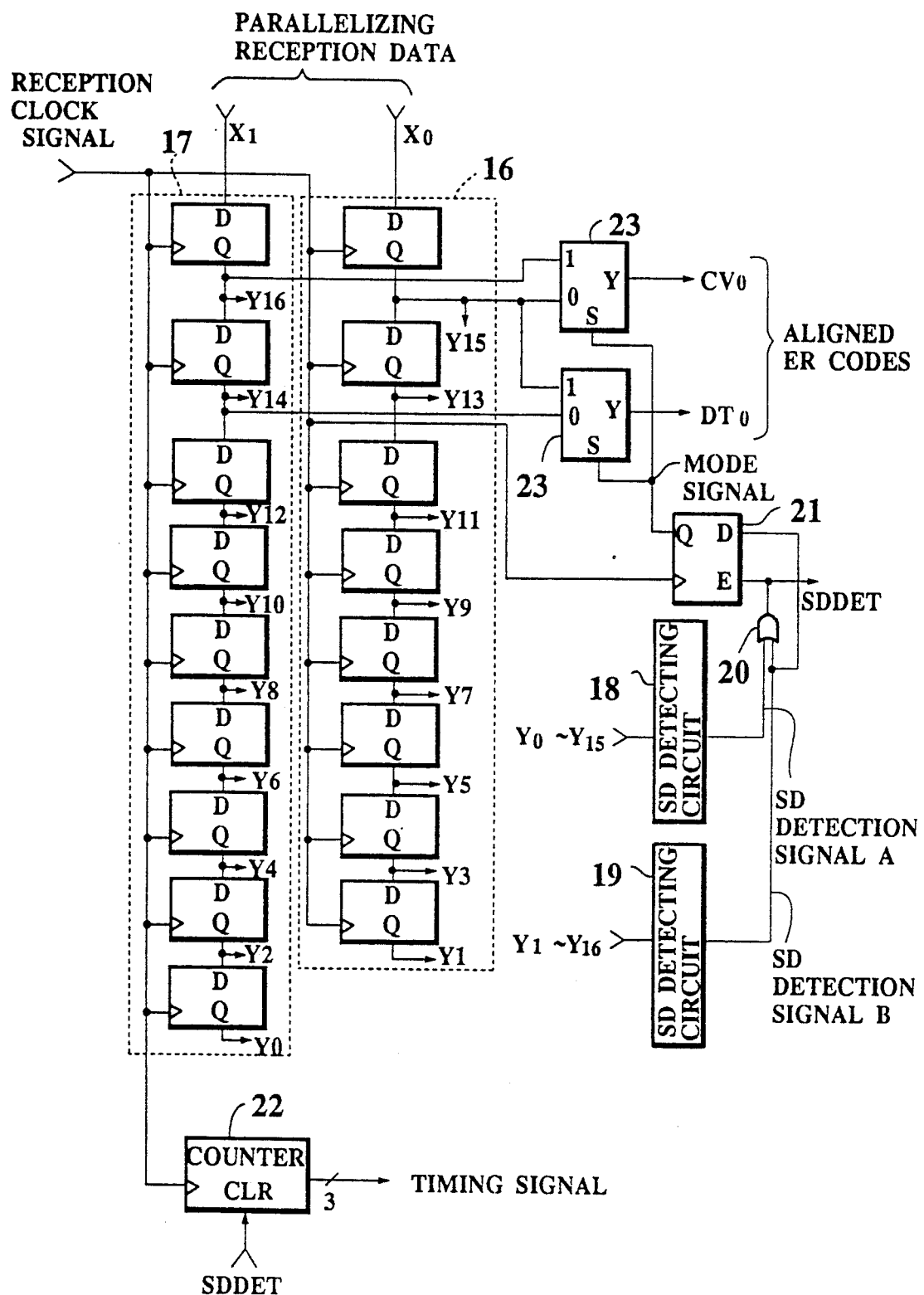

In FIG. 5, the alignment circuit 13 has an eight-bit shift register 16 and a nine-bit shift register 17 respectively comprising cascade connection of D-type flip-flops (F/F). The eight-bit shift register 16 shifts the higher bits X0 of the parallelized reception data given from the media interface 11 successively in synchronism with the reception clock signal. While, the nine-bit shift register 17 shifts the lower bits X1 of the parallelized reception data successively in synchronism with the reception clock signal. In this case, the higher bits X0 are received prior to the lower bits X1.

Since the data to be given to the shift registers 16, 17 as the parallelized reception data are the lower bits X1 and the higher bits X0 respectively parallelized by two bits, for example, when the SD pattern of "JKOJ-KOOO" (which is designated as "1101001101000000" by the ER codes) is given to the shift registers 16, 17, as schematically shown in FIG. 6, these two kinds of bits are held in two ways, that is, a first and a second alignment mode. Accordingly, means for discriminating and selecting either of the two alignment mode is required. Then, returning to FIG. 5, the discriminating and selecting means is described.

Of outputs (Y1, Y3, Y5, Y7, Y9, Y11, Y13, Y15) in respective stages of the shift register 16 and outputs (Y0, Y2, Y4, Y6, Y8, Y10, Y12, Y14, Y16) in the respective stages of the shift register 17, the shift registers 16, 17 give the outputs Y0 through Y15 to an SD detecting circuit 18 and the outputs Y1 through Y16 to an SD detecting circuit 19.

The SD detecting circuits 18, 19 detect SD from the parallelized reception data successively given by the media interface 11 by comparing the outputs of 16 bits given from the shift registers 16, 17 with the SD pattern designated as "JKOJKOOO" by the DM codes. When SD is detected from the result of the comparison, the SD detecting circuits 18, 19 output SD detection signals A, B respectively.

When the parallelized reception data given from the media interface are in the same cycle as that of the reception clock signal and express correct DM codes, or in case of the first mode shown in FIG. 6, the SD detecting circuit 19 detects SD and outputs the SD detection signal B to an OR gate 20. While, when the reception data of ER codes given from the media interface 11 bestride different cycles of the reception clock signal, and correct DM codes can not be given as X0, X1 to the shift registers at the same time, or in case of the second mode shown in FIG. 6, the SD detecting circuit 18 detects SD and outputs the SD detection signal A to the OR gate 20.

The OR gate 20 detects that either of the SD detecting circuits 18 and 19 detects SD, and gives an SD detection timing (SDDET) signal to an F/F 21, a counter 22 and the transmission-reception control circuit 15.

When SD is detected and the SDDET signal of the level "1" is given, the F/F 21 takes in the SD detection signal B and gives it as an alignment mode (MODE) signal to selector circuits 23.

Figure 7:
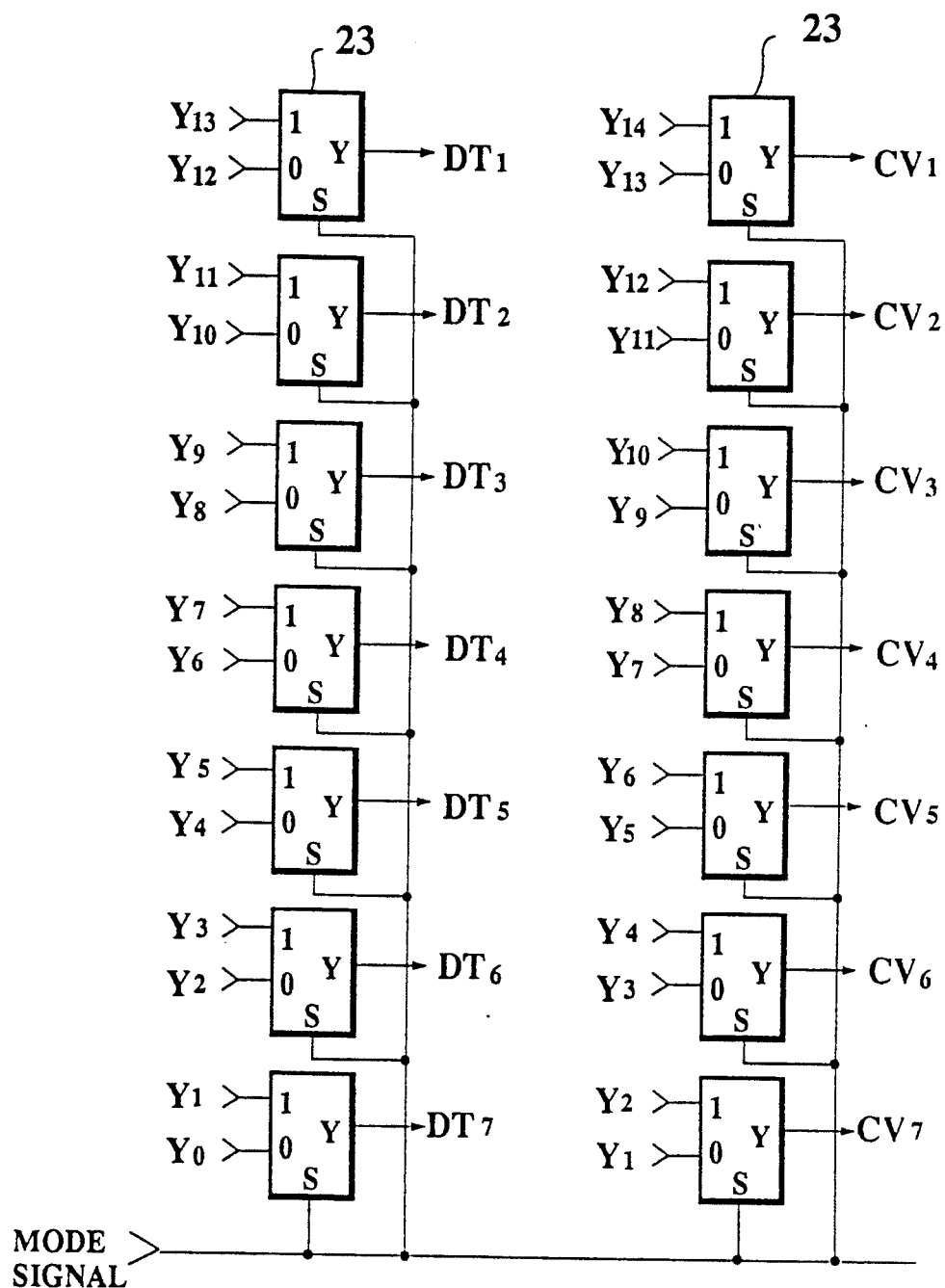
Figures 8, 9:
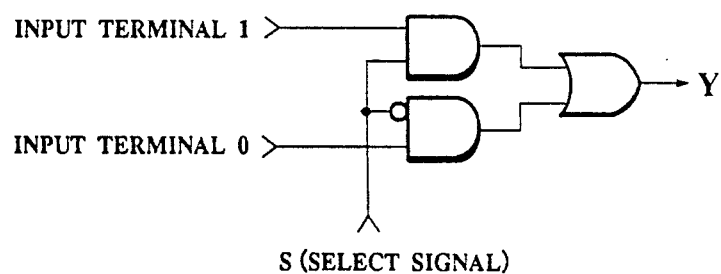
FIG. 8 is a diagram to explain operation of circuits shown in FIGS. 5 and 7.

The selector circuits 23 select correct ER codes each of which is one unit of information from the parallelized reception data shifted and held in the shift registers 16, 17, and align them. As shown in FIGS. 5 and 7, the selector circuits 23 are provided correspondingly to bits in the data portions (DT0 to DT7) and the code violation portions (CV0 to CV7) of the ER codes composing the reception data, and generate the reception data comprising eight units of information. The respective selector circuits 23 select the outputs corresponding to the respective stages of the shift registers 16, 17 in accordance with a value of the MODE signal as shown in FIG. 8 to obtain an aligned ER code. The selector 23, for example as shown in FIG. 9, can be composed by combination of OR gates.

The counter 22 is a three-bit binary counter, and carries out counting operation in synchronism with the reception clock signal. In this case, a count value obtained by the counter 22 is cleared by the SDDET signal of the level "1". Namely, the count value of the counter 22 becomes "000" when the SD is detected, and is increased in synchronism with the reception clock signal after then. Accordingly, the count value indicates a timing of a unit of information composing the reception data, which follows SD. Therefore, the count value of "111" indicates the (8×n)th clock (n=1, 2, ...) from the detection of SD. As the result, the boundaries of the reception data which exist every eight units of information can be indicated.

The first embodiment of the present invention is constructed as described above. Next, the operation of this embodiment is explained with reference to FIGS. 10 and 11.

First, the case in which the parallelized reception data inputted at the same time to the alignment circuit 13 of the NC device 12 from the media interface 11 show correct ER codes of the reception data, or the first mode is described with reference to FIG. 10.

The input signal given to the media interface 11 from the network is converted from the DM codes into the ER codes by the media interface 11, then is given to the alignment circuit 13 of the NC device 12 as the parallelized reception data in synchronism with the reception clock signal extracted from the input signal.

Then, the higher bits X0 of the parallelized reception data successively given to the alignment circuit 13 are successively shifted and held by the shift register 16, and the lower bits X1 of the parallelized reception data are successively shifted and held by the shift register 17. These bits of the parallelized reception data respectively held by the shift registers 16, 17 are given to the SD detecting circuits 18, 19 correspondingly.

Figure 10:
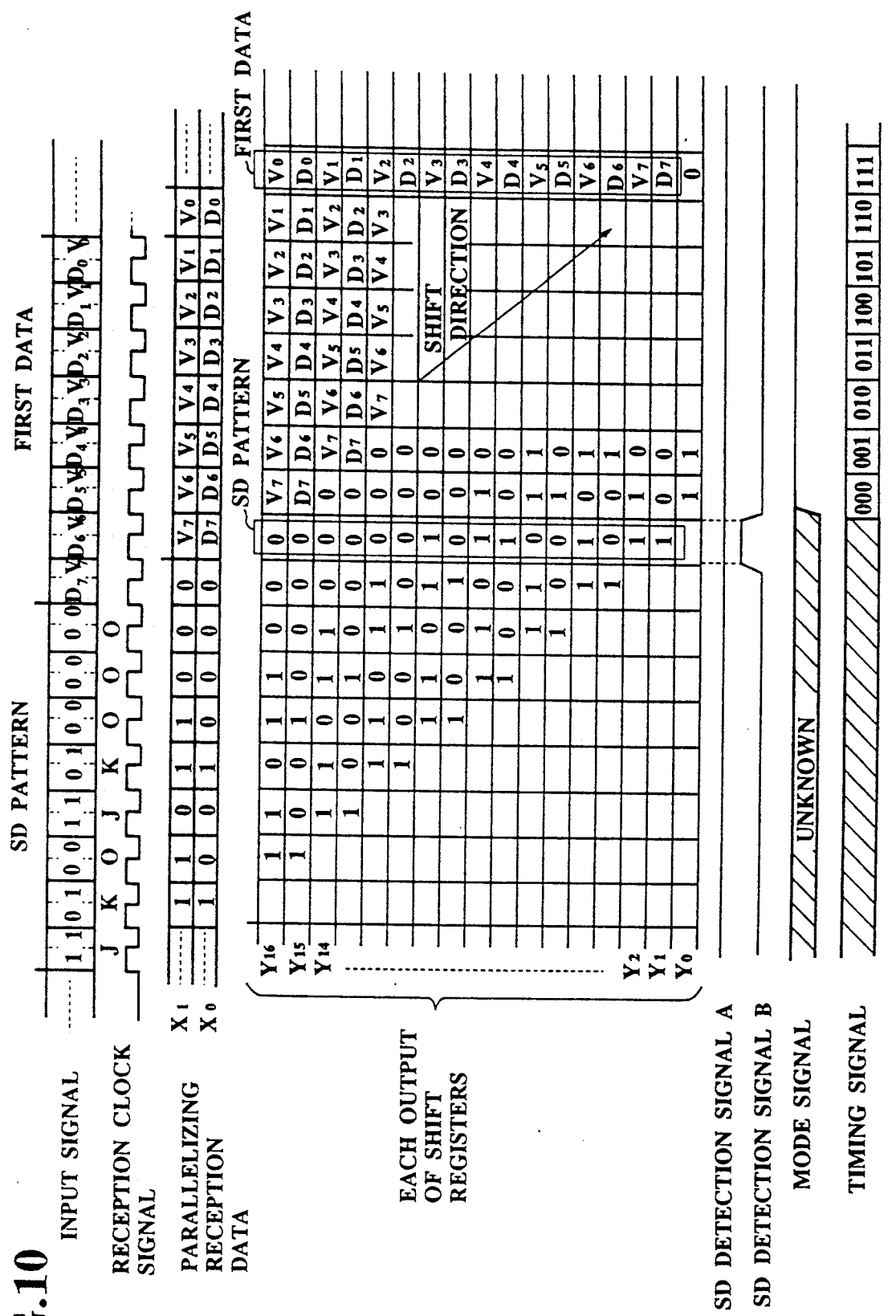
FIGS. 10 and 11 are diagrams to explain operation of the device shown in FIG. 3.

In this case, since the ER codes obtained by conversion of the SD pattern are given in synchronism with the reception clock signal as shown in FIG. 10, the SD pattern given to the input signal is given to the SD detecting circuit 19 as the respective outputs of Y1 to Y16 of the shift registers 16, 17. As the result, the SD given to the input signal is detected by the SD detecting circuit 19, and the level of the SD detection signal B becomes "1". Then, the SD detection signal B is taken in the F/F 21 in synchronism with the reception clock signal and the level of the SDDET becomes "1".

As the result, the MODE signal as the output from the F/F 21 becomes the level "1", and is given to the respective selector circuits 23. Thereby, the respective selector circuits 23 select the outputs in the respective stages of the shift registers 16, 17 as shown in FIG. 8. While, the SDDET signal is given to the counter 22, and the position of a unit of information of the parallelized reception data following the SD is counted. Then, the count value is outputed as a timing signal as shown in FIG. 10.

Then, the parallelized reception data following SD are shifted and held in the shift registers 16, 17 correspondingly in synchronism with the reception clock signal, and when the count value of the counter 22 reaches "111", first reception data comprising eight units of information following the SD are obtained as shown in FIG. 10 as the aligned ER codes which are outputs of the respective selector circuits 23. Also after the first reception data, the reception data when the count value is "111" are obtained as outputs of the selector circuits 23.

Next, the case in which the parallelized reception data inputted at the same time to the alignment circuit 13 of the NC device 12 from the media interface 11 show incorrect ER codes of the reception data, or the case in which the ER codes shift from the reception clock signal by a half cycle so that the correct ER codes bestride serial different cycles of the reception clock signals, that is, the second mode is described with reference to FIG. 11.

Figure 11:
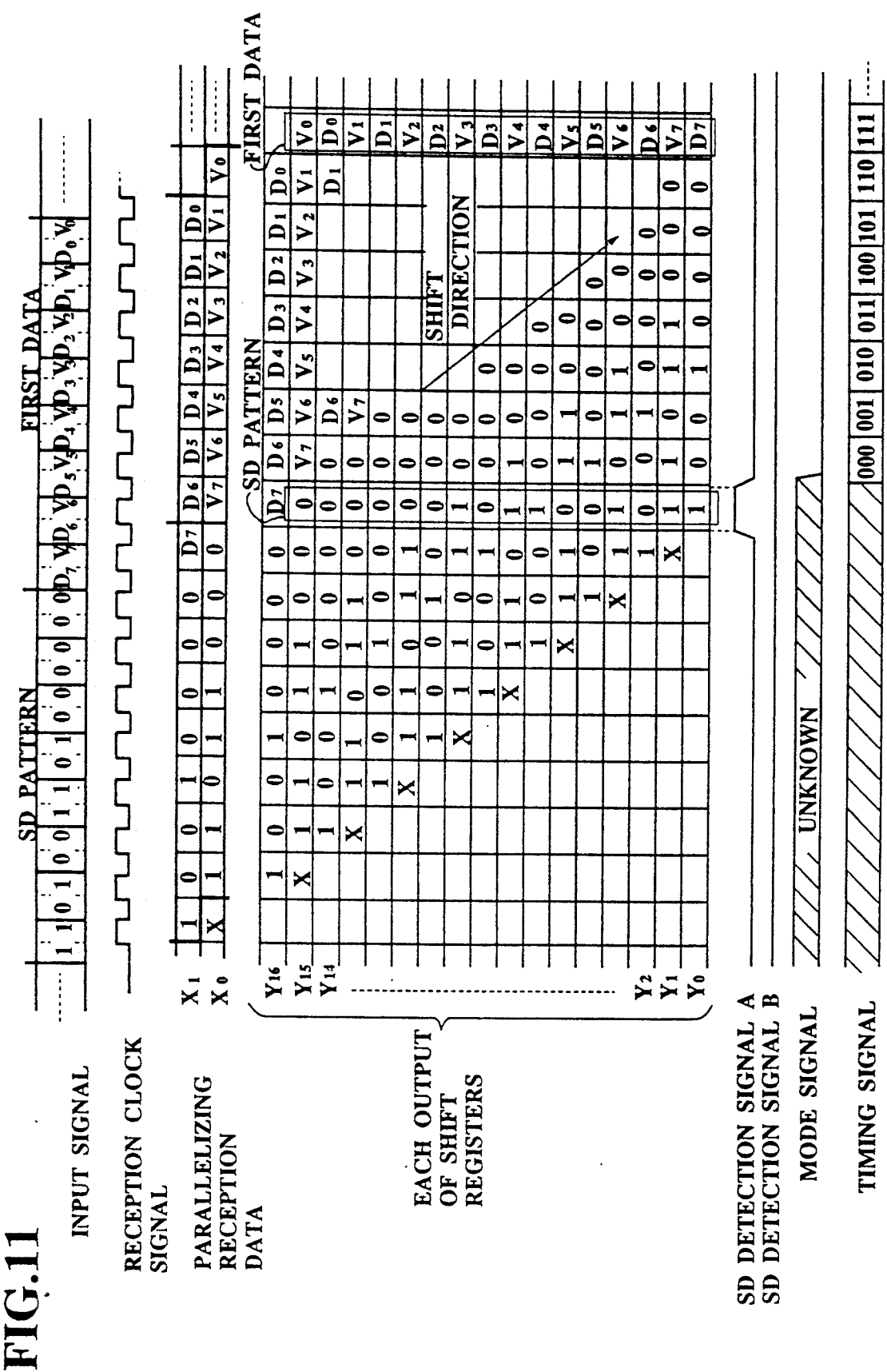

In this case, since the correct ER codes of reception data can not be given at the same time to the corresponding shift registers 16, 17 as the parallelized reception data, the SD pattern which is given to the input signal and is taken and held in the respective shift registers 18, 17 in synchronism with the reception clock signal is obtained as the outputs Y0 to Y15 of the respective shift registers 16, 17 as shown in FIG. 11. As the result, the SD is detected by the SD detecting circuit 18, and the level of the SD detection signal A becomes "1", and also the level of the SDDET signal becomes "1". Accordingly, the SD detection signal B of the level "0" is given to the input of the F/F 21, and the level of the MODE signal becomes "0".

When the level of the MODE signal becomes "0", the respective selector circuits 23 select the outputs in the respective stages of the shift registers 16, 17 as shown in FIG. 8, and as described above, whenever the count value of the counter 22 is "111", the reception data comprising eight units of information of correct ER codes following the SD can be obtained.

As stated above, according to this embodiment, it becomes possible to extract the reception data correctly from the input signal not by the clock signal having a frequency which is twice as high as the transfer speed of the signal transferred on the network but by the clock signal having the same frequency as the transfer speed. For example, in a network having a signal speed of 16 Mbits/sec, a reception clock signal of 32 MHz is required in the prior art. However, in this embodiment, it is possible to obtain correct reception data even by a reception clock signal of 16 MHz.

Accordingly, since the frequency of the operational clock of the NC device 12 can be reduced into a half of that in the prior art, it becomes unnecessary to operate the internal circuits at a high speed. Thereby, the power consumption can be cut down and the capacity of the power source can be reduced, so that it becomes possible to realize a small-scale communication control device. Moreover, it becomes unnecessary to consider the fine processing of circuits and delay of signal transmission so much. As the result, the circuit design and layout design can be easily carried out.

Next, another embodiment of the present invention is described.

Figure 12:
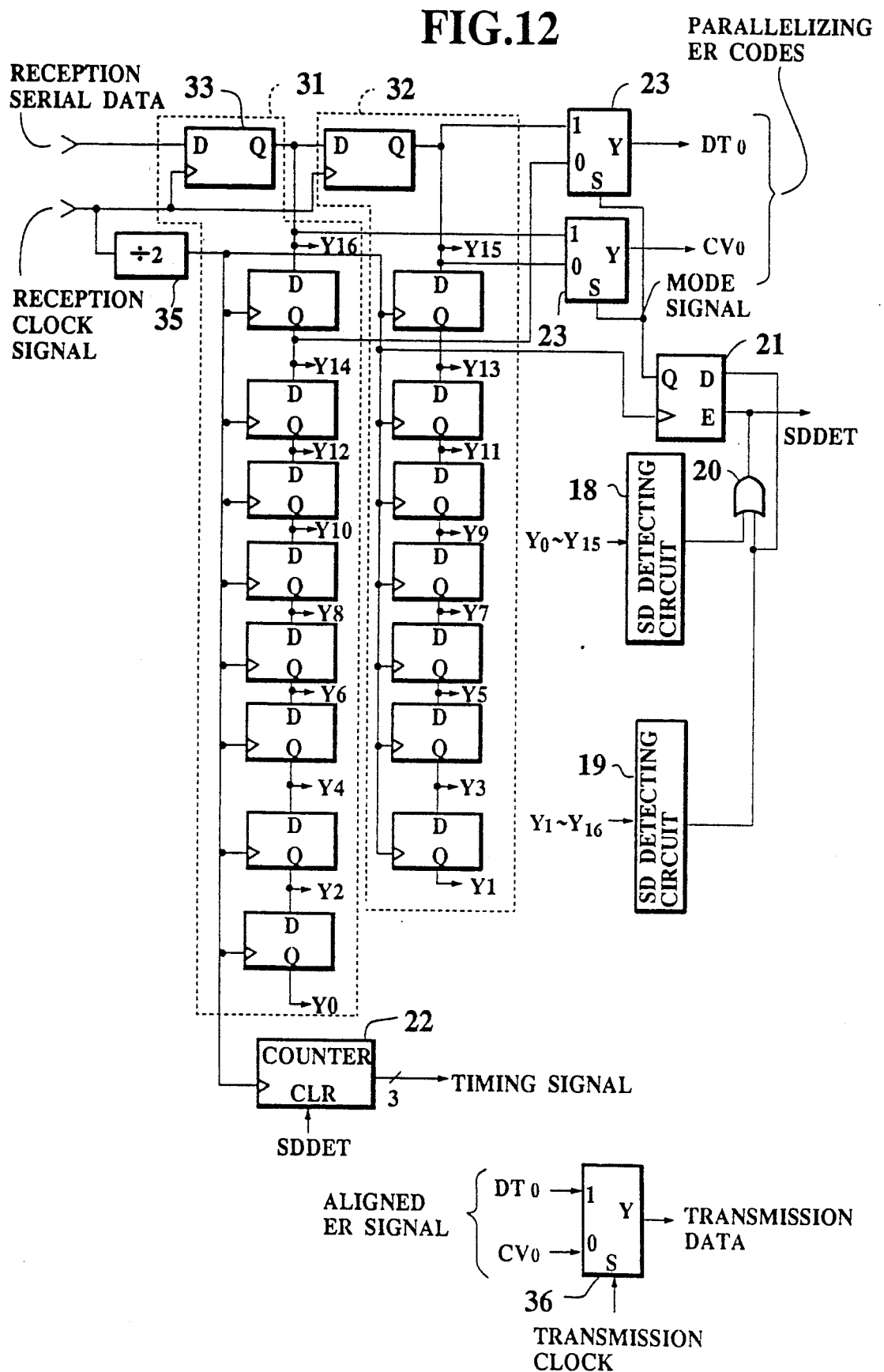
FIG. 12 is a diagram to show construction of a main part related to another embodiment of the present invention.

FIG. 12 is a diagram to show construction of an alignment circuit related to another embodiment of the present invention. A feature of this embodiment is in that a media interface does not parallelize ER codes extracted from an input signal given from a network, and an alignment circuit in an NC device carries out it.

Therefore, in this embodiment, the media interface does not have a parallelizing circuit 9 as shown in FIG. 3, and the NC device includes F/F 33, 34 for the parallelization instead.

Namely, in FIG. 12, the ER codes which are converted from DM codes as the input signal by the media interface are serially operated in synchronism with a reception clock signal having a frequency which is twice as high as the input signal composing respective first steps of shift registers 31, 32, and successively shifted in the F/F 33, 34 whose outputs are Y16, Y15 respectively. Thereby, the ER codes which are parallelized and held in the F/F 33, 34 are shifted and held in shift registers 31, 32 correspondingly in synchronism with the reception clock signal divided into two halves by a divider 35, so as to detect SD in the same manner as in the previous embodiment. While, the aligned ER codes are serialized by a selector circuit 36 in accordance with a transmission clock, and given to the media interface as transmission data. Incidentally, in FIG. 12, parts or portions designated by the same reference numerals or characters have the same functions respectively as in FIG. 5, thus the explanation on them is omitted here.

In such a construction, since the ER codes which are transmitted or received between the media interface and the NC device are serially transferred, it is possible to reduce the number of signal lines. And, it is possible to delete a difficulty of forming a logic circuit into the media interface comprising analog circuits.

Next, still another embodiment of the present invention is explained.

Figure 13:
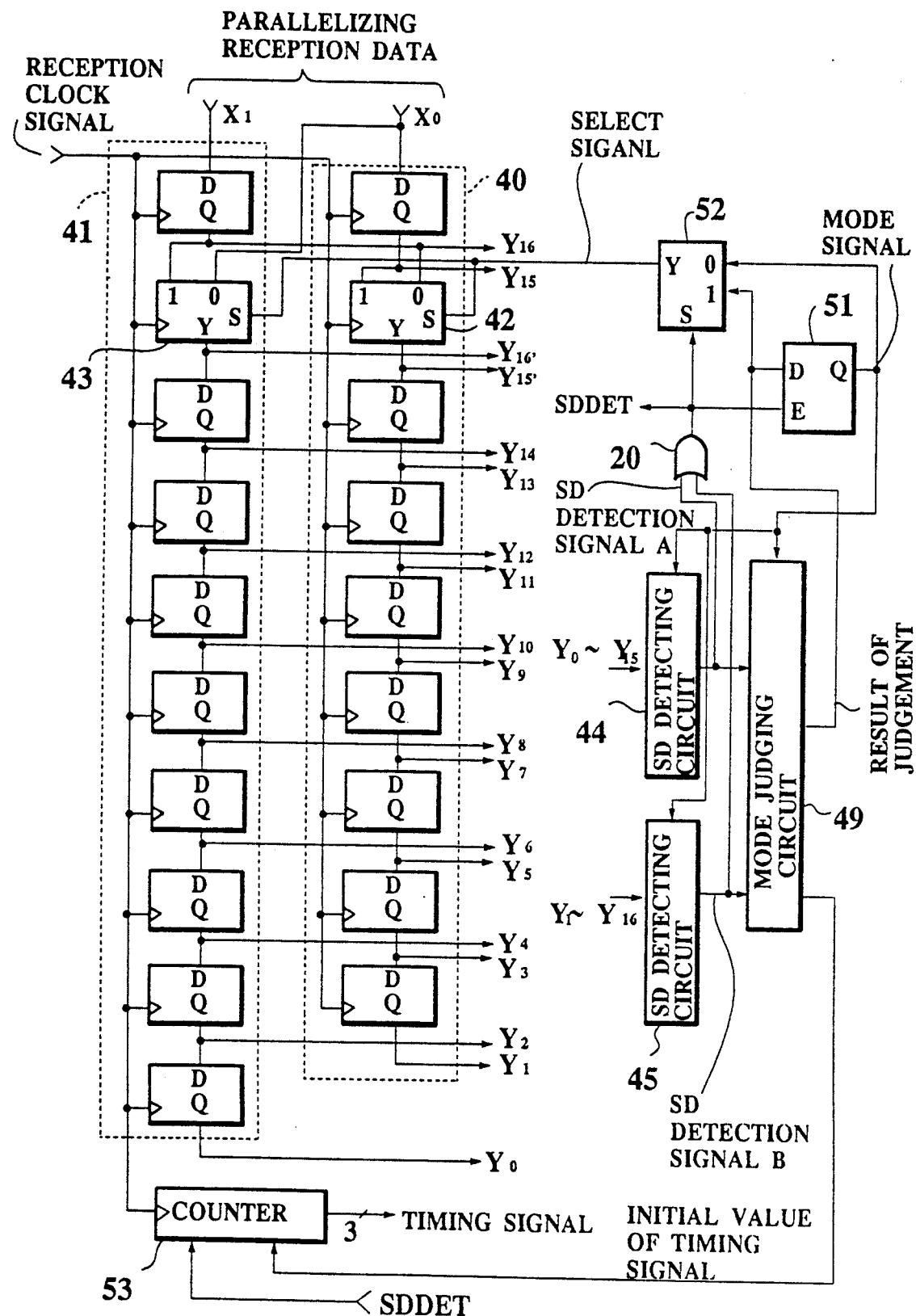
FIG. 13 is a diagram to show construction of an alignment circuit related to still another embodiment of the present invention.

FIG. 13 is a diagram to show construction of an alignment circuit 13 related to this embodiment.

In FIG. 13, shift registers 40, 41 are composed by respectively inserting selector circuits 42, 43 between F/F of the first and the second stages of the shift registers 16, 17 shown in FIG. 5.

The selector circuit 42 selects output Y15 of an F/F when the level of a SELECT signal is "1", or selects output Y16 of an F/F when the level of the SELECT signal is "0", then gives the output Y15' to an F/F of the next stage whose output is Y13. While, the selector circuit 43 selects output Y16 of the F/F when the level of the SELECT signal is "1", or selects parallelized reception data X0 when the level of the SELECT signal is "0", then gives the output Y16' to an F/F of the next stage whose output is Y14.

While, SD detecting circuits 44, 45 detect coincidence between the respective outputs of the shift registers 40, 41 and the SD pattern in the same manner as the SD detecting circuits 18, 19, and are respectively constructed as shown in FIG. 14.

In FIG. 14, the SD detecting circuit 44 uses the output Y15 of the F/F selected by the selector circuit 46 as the lowest bit (which judges "0") of the SD pattern when the level of a MODE signal is "1", and uses the output Y16 of the F/F selected by the selector circuit 46 as such when the level of the MODE signal is "0".

While, the SD detecting circuit 45 uses the outputs Y15, Y16 of the F/F Selected by the selector circuits 47, 48 as the second lowest bit of the SD pattern when the level of the MODE signal is "1", and uses the output Y16 of the F/F and the parallelized data X0 selected by the selector circuits 47, 48 as such when the level of the MODE signal is "0".

Returning to FIG. 13, a MODE judging circuit 49 gives its result of judgement to an F/F 51 and a selector circuit 52 in accordance with an SD detection signal A and an SD detection signal B when the SD is detected, and the MODE signal previous to the SD detection, then gives an initial value of a timing signal to a counter 53. The MODE judging circuit 49, as shown in FIG. 15, judges the result of judgement and the initial value of the positional signal. For example, as shown in FIG. 15, the MODE judging circuit 49 judges the level of the result of judgement to be "0" when the level of the MODE signal before the SD is detected is "1" and the level of the SD detection signal A is "1" when the SD is detected, and decides the initial value of the timing signal to be "001" in the binary expression.

The F/F 51 takes in and holds the result of judgement of the MODE judging circuit 49 when the SD is detected and the SDDET signal is given from the OR gate, then outputs the result of judgement to the MODE judging circuit 49 and the selector circuit 46, 48, 52, 54, 55 as the MODE signal.

The selector circuit 52 selects the MODE signal or the result of judgement outputted from the MODE judging circuit 49 in accordance with the SDDET signal, and gives it to the selector circuits 42, 43. The selector circuit 52 selects the result of judgement when the level of the SDDET signal is "1", and selects the MODE signal when the level is "0".

The counter 53 functions in the same manner as the counter 22 shown in FIG. 5, but differs from the counter 22 in that the initial value of the timing signal outputted from the MODE judging circuit 49 is set when the level of the SDDET signal is "1".

Figure 16:
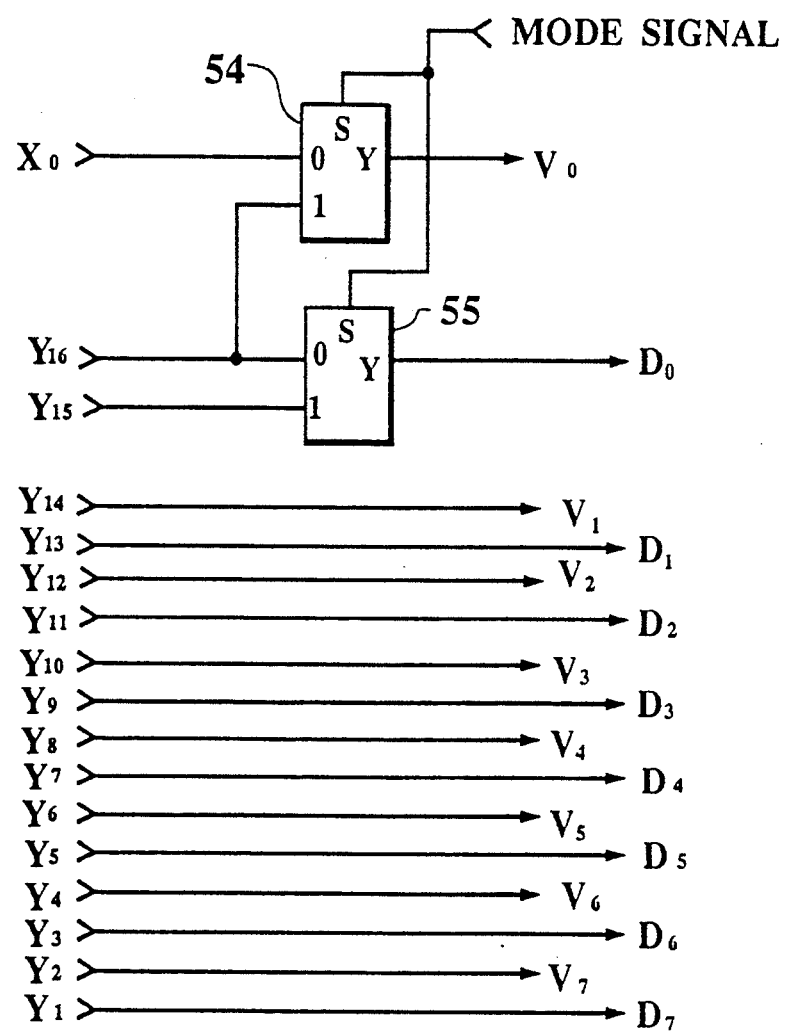

From the outputs Y1 to Y16 and the parallelized reception data X0 of the respective shift registers 40, 41 obtained by such construction, as shown in FIG. 16, reception data (DT0 to DT7 in the data portion, CV0 to CV7 in the code violation portion) are obtained. In FIG. 16, the reception data DT1 to DT7 and CV1 to CV7 are directly corresponding to the outputs Y1 to Y14 of the F/F.

While, with respect to the reception data CV0, the output Y16 of the F/F is correspondingly selected by the selector circuit 54 when the level of the MODE signal is "1", and the parallelized reception data X0 is correspondingly selected by the selector circuit 54 when the level is "0". Moreover, with respect to the reception data DT0, the output Y15 of the F/F is correspondingly selected by the selector circuit 55 when the level of the MODE signal is "1", and the output Y16 of the F/F is correspondingly selected by the selector circuit 55 when the level is "0".

Next, the alignment circuit shown in FIG. 13 is explained with reference to FIGS. 17 through 20.

Figure 17:
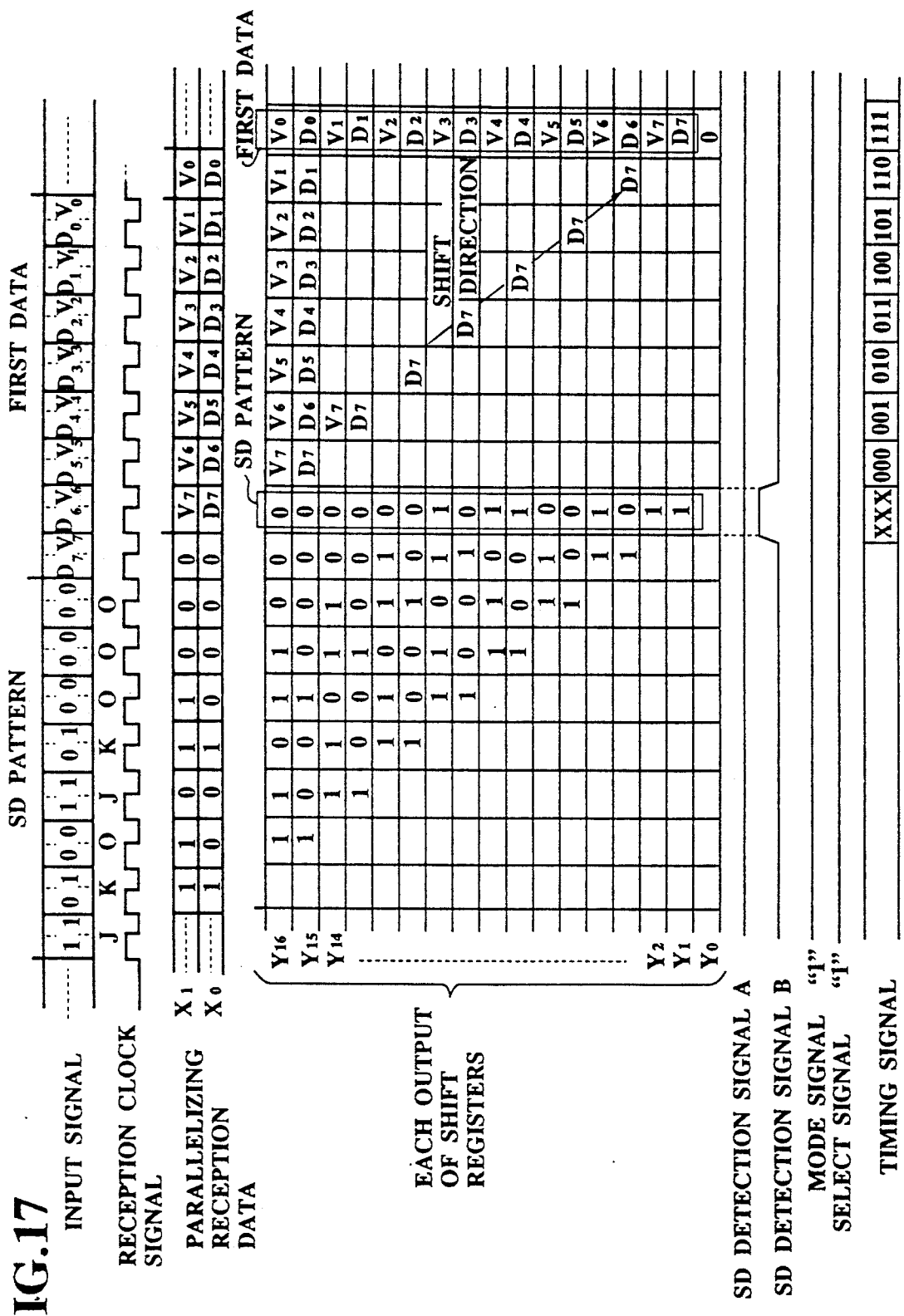
FIGS. 17 through 20 are diagrams to explain operation of the circuit shown in FIG. 13.

FIG. 17 shows the operation when the MODE signal is "1" and the reception clock signal and the ER codes are matched with each other. Since the MODE signal is "1", the shift registers 40, 41 shift the outputs from Y15, Y16 to Y13, Y14 directly, and output them to the Y0 to Y16. At the time, the SD pattern is detected in the Y1 to Y16 outputs, and the level "1" is outputted to the SD detection signal B. The MODE judging circuit 49 outputs a new MODE signal "1" as the result of judgement as shown in FIG. 15, and also outputs "000" as the initial value of the timing signal. Since the new MODE signal is also "1", the SELECT signal remains "1". Therefore, the aligned ER codes are outputted correspondingly to the outputs Y1 to Y16, and can be taken out as the first reception data when the timing signal is "111".

Figure 18:
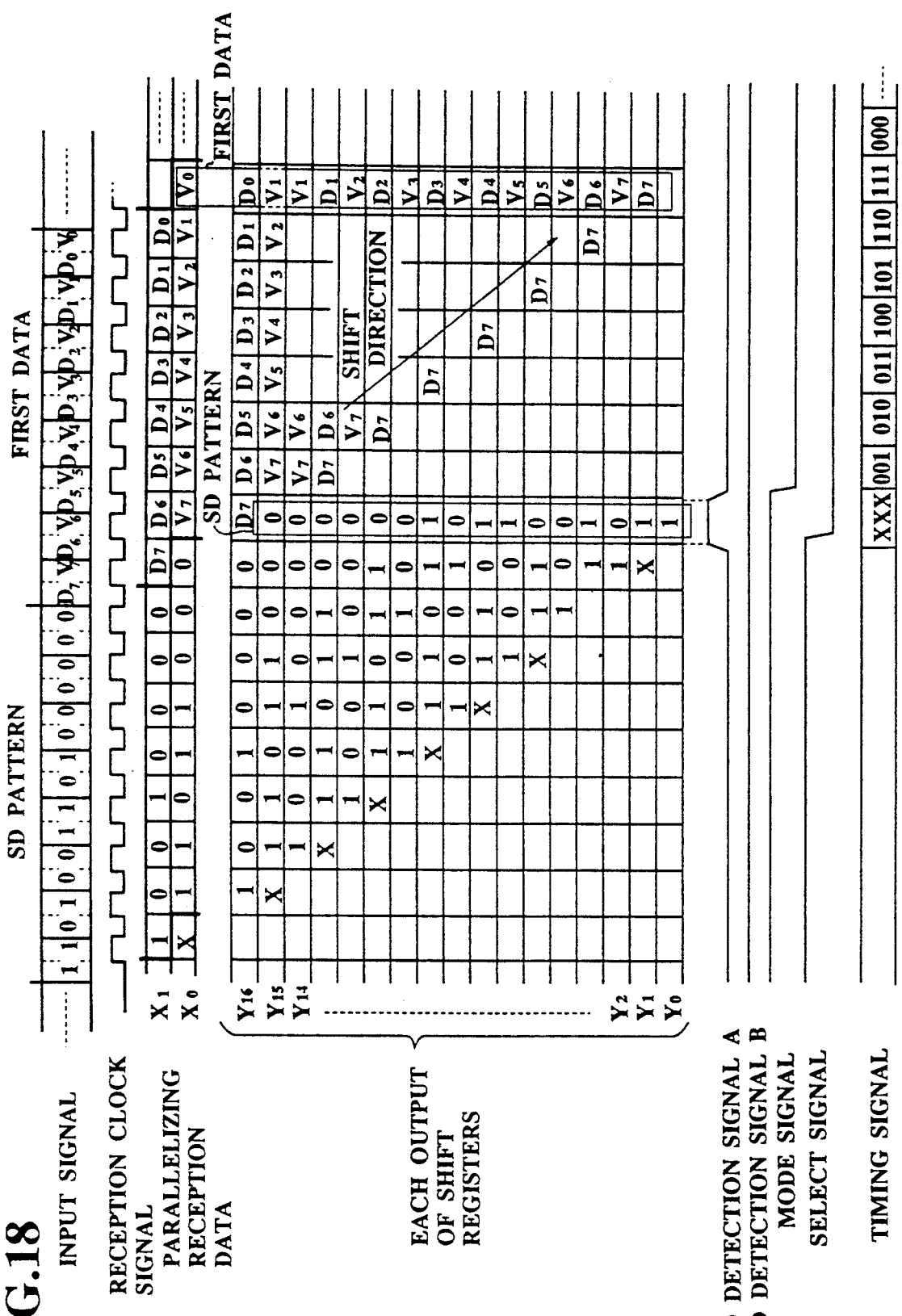

FIG. 18 shows a case in which the reception clock signal and the ER codes shift from each other when the MODE signal is "1". Since the MODE signal is "1", the shift registers 40, 41 shift the outputs from Y15, Y16 to Y13, Y14 directly, and outputs them to Y0 to Y16. At the time, the SD pattern is detected in the outputs Y0 to Y15, and the level "1" is outputted to the SD detection signal A. The MODE judging circuit 49 outputs a new MODE signal "0" as the result of judgement as shown in FIG. 15, and also outputs "001" as the initial value of the positional signal. Since the new MODE signal is "0", the SELECT signal changes into "0" immediately, then the selector circuits 42, 43 operate so that the Y13 shifts into the value of the output Y16, and the Y14 shifts into the value of the data X0. Accordingly, the aligned ER codes are outputted correspondingly to the outputs Y1 to Y14, Y16 and the data X0. Since the reception data DT0 and CV0 are selected so that the output Y16 and the data X0 are outputted respectively, they can be taken out as the first reception data when the positional signal is "111".

Figure 19:
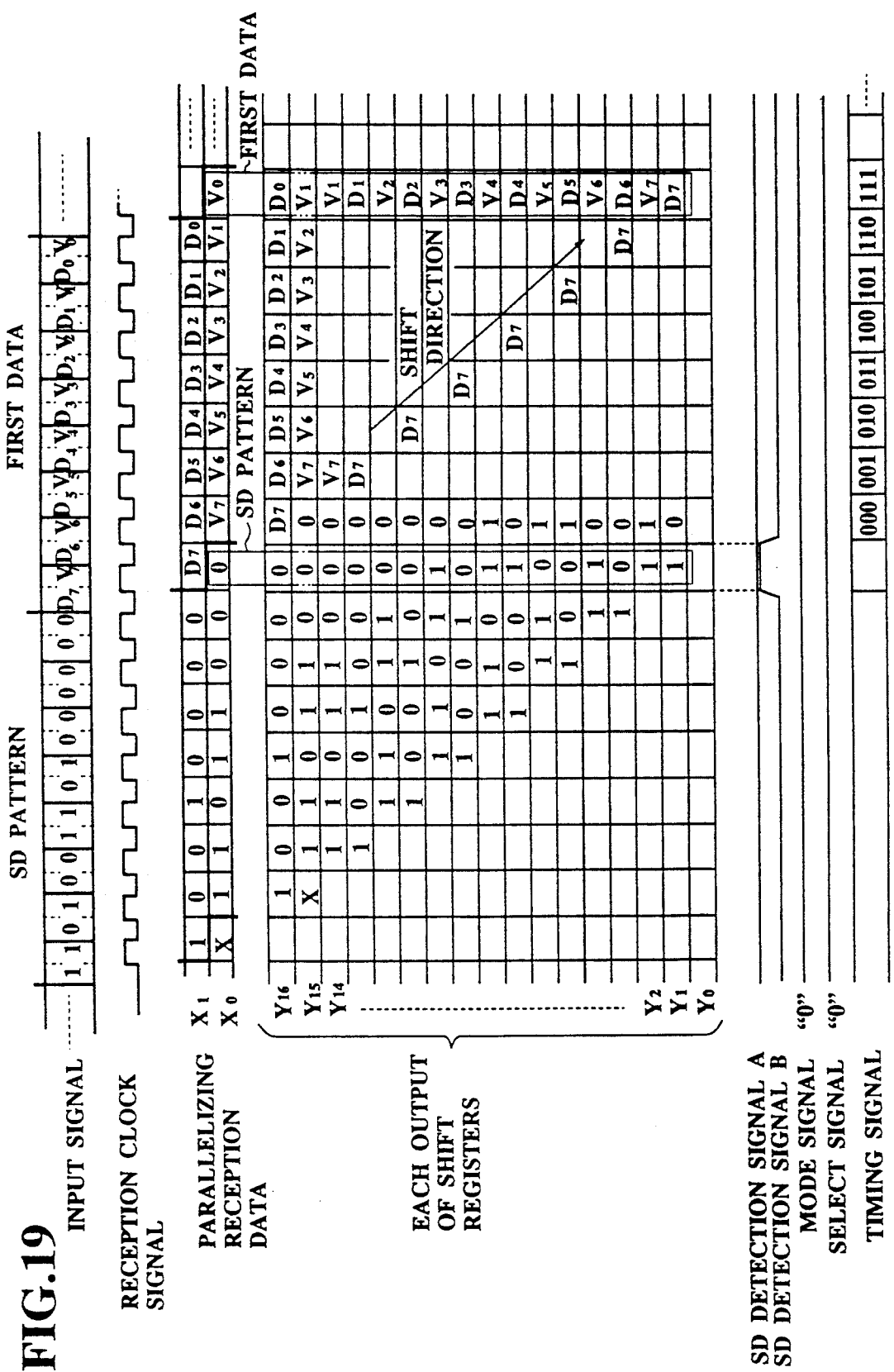

FIG. 19 shows a case in which the reception clock signal and the ER codes shift from each other when the MODE signal is "0". Since the MODE signal is "0", the shift registers 40, 41 shift the outputs from Y16, X0 to Y13, Y14 directly, and outputs them to Y0 to Y16. At the time, the SD pattern is detected in the outputs Y1 to Y14, Y16 and the data X0. However, since the SD detecting circuit 45 detects coincidence of the SD pattern when the MODE signal is "0", the level "1" is outputted to the SD detection signal B. Then, the MODE judging circuit 49 outputs a new MODE signal "0" as the result of judgement as shown in FIG. 15, and also outputs "000" as the initial value of the timing signal. Since the new MODE signal is also "0", the SELECT signal remains "0", and the selector circuits 42, 43 operate so that the output Y13 shifts into the value of the output Y16 and the output Y14 shifts into the value of the data X0. Accordingly, the aligned ER codes are outputted to the outputs Y1 to Y14, Y16 and the data X0. Therefore, since the reception data DT0 and CV0 are selected so that the output Y16 and the data X0 are outputted respectively, they can be taken out as the first reception data when the positional signal is "111".

Figure 20:
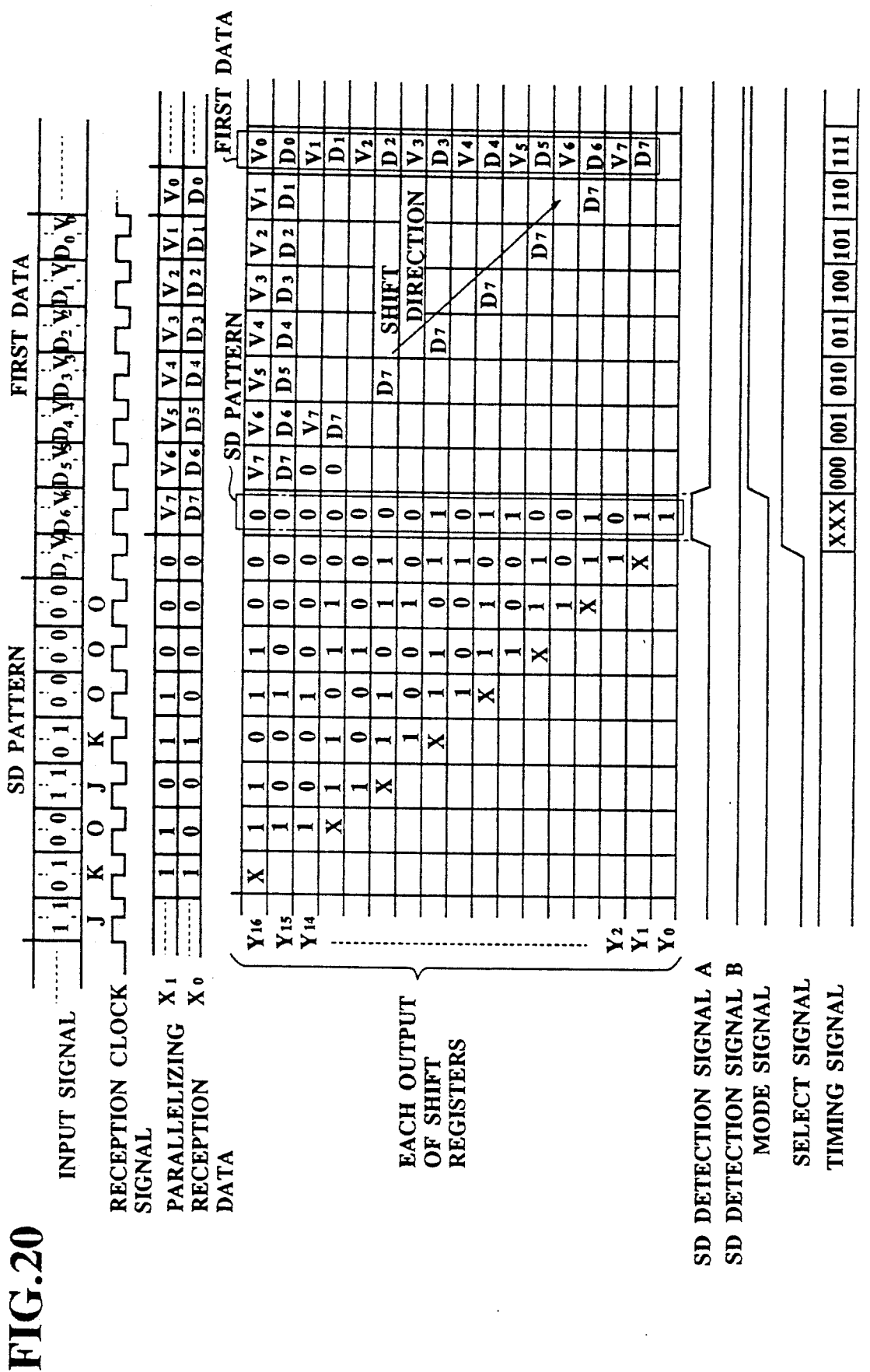

FIG. 20 shows a case in which the reception clock signal and the ER codes are matched with each other when the MODE signal is "0". Since the MODE signal is "0", the shift registers 40, 41 shift the outputs from Y16, X0 to Y13, Y14 directly, and outputs them to Y0 to Y16. At the time, the SD pattern is detected in the outputs Y0, Y14, Y16. However, since the SD detecting circuit 44 detects coincidence of the SD pattern when the MODE signal is "0", the level "1" is outputted to the SD detection signal A. Then, the MODE judging circuit 49 outputs a new MODE signal "1" as the result of judgement as shown in FIG. 15, and also outputs "000" as the initial value of the timing signal. Since the new MODE signal is "1", the SELECT signal changes into "1" immediately, and the shift registers 40, 41 take in the data X0, X1 directly. As the result, the aligned ER codes are outputted to the outputs Y1 to Y16, and they can be taken out as the first reception data when the timing signal is "111".

As stated above, in this embodiment, since the selector circuits are provided in the reception data holding portion composed of the shift registers, the number of the selector circuits can be further reduced as compared with the previous embodiment.

Moreover, since the MODE signal is outputted to the SELECT signal when the SD is not detected, the selector circuits 54, 55 for preparing the aligned ER codes are equivalent to the selector circuits 42, 43 in the shift registers 40, 41. Namely, if the aligned ER codes are not used just when the SD is detected, the alignment circuits 54, 55 can be replaced by the alignment circuits 40, 41. This replacement can be carried out by outputting Y15 as DT0 and Y16 as CV0. In the case of such a construction, the number of the selector circuits required are six including those included in the SD detecting circuits 44, 45. Accordingly, as compared with the sixteen selector circuits required for the previous embodiment, this embodiment can be realized by a far small number of components.

Incidentally, it should be clearly understood that this invention is not limited to the above embodiments. For example, it is possible that the parallelized reception data are composed of units of N bits. In such a case, it is necessary to prepare shift registers, SD detecting circuits and selector circuits of N inputs for the parallelized reception data composed of the N-bit units, and generate a MODE signal so that the N-input selector circuits can select suitable outputs from respective stages of the shift registers. For example, in case of a signal speed of 100 Mbits/sec, if the media interface outputs parallelized reception data of 8 bits and a reception clock signal of 25 MHz, it is possible to construct the alignment circuits in the NC device using eight shift registers and SD detecting circuits and sixteen 8-input selector circuits. In summary, according to the present invention, since the communication data given as a serial row of bits are parallelized to form parallelized data, and desired data are selected and extracted from the communication data in synchronism with the parallelized data, it becomes possible to carry out the operational process on or after the parallelization of the communication data in synchronism with a clock signal of a frequency which is the same as or lower than the transfer speed of the communication data. As the result, a communication control device of low power consumption and easy design and manufacture can be provided without making construction of the input-output portion thereof to a network complicated.

Various modifications will become possible for those skilled in the art after receiving the teachings of the present disclosure without departing from the scope thereof.

What is claimed is:

1. A communication control device for communicating communication data composed of a serial row of bits with a communication network, the communication control device comprising:
   (a) converting means for separating reception data composed of a serial row of bits given from the communication network every p bits in order of input to form new data composed of parallel rows of p bits;
   (b) clock generating means for generating a constant clock signal which is synchronous to the data composed of parallel rows of p bits;
   (c) a holding portion to successively take in and hold the data composed of parallel rows of p bits given from the converting means in synchronism with the constant clock signal generated by the clock generating means;
   (d) a discriminating portion which compares a plurality of subsets of data generated from the data composed of parallel rows of p bits held by the holding portion with data start discriminating information and discriminates an alignment mode of the units of the data which accord with the data start discriminating information; and (e) an extracting portion to extract n-bit data in the form of p rows of n parallel bits from the data composed of parallel rows of p bits held by the holding portion in accordance with the alignment mode discriminated by the discriminating portion, wherein the number p is smaller than the number n.

2. The communication control device according to claim 1, wherein
the discriminating portion is constructed to discriminate a start of data when some of the units of data accord with the data start discriminating information.

3. The communication control device according to claim 1, wherein
the extracting portion is constructed to extract correct reception data from the data composed of parallel rows of p bits held by the holding portion and following a unit of data which accords with the data start discriminating information in accordance with the alignment mode discriminated by the discriminating portion when the discriminating portion discriminates the start of data.

4. The communication control device according to claim 1, wherein
the holding portion is composed of shift registers for aligning and holding the data composed of parallel rows of p bits given from the converting means in accordance with the alignment mode discriminated by the discriminating portion, and the extracting portion is composed of selectors for controlling and outputting the alignment state of the data composed of parallel rows of p bits given from the shift registers in accordance with the alignment state discriminated by the discriminating portion.

5. The communication control device according to claim 1, wherein
the converting means is constructed to separate the data composed of a serial row of bits given from the communication network every $2^n$ bits in order of input to form new data composed of parallel rows of $2^n$ bits, and the clock generating means is constructed to generate a clock signal which is synchronous to the data composed of parallel rows of $2^n$ bits.

6. The communication control device according to claim 1, wherein
the converting means and the clock generating means are constructed as a media interface and the holding portion, the discriminating portion, and the extracting portion are constructed as a network control device.

7. The communication control device according to claim 1, wherein the converting means, the clock generating means, the holding portion, the discriminating portion, and the extracting portion are constructed as a network control device.

8. An alignment circuit, comprising:
(a) a holding portion to successively take in and hold data composed of parallel rows of p bits in synchronism with a constant clock signal P which is synchronous to the data composed of parallel rows of p bits;
(b) a discriminating portion which compares a plurality of subsets of data generated from the data composed of parallel rows of p bits held by the holding portion with data start discriminating information, and discriminates an alignment mode of the units of the data which accord with the data start discriminating information; and
(c) an extracting portion to extract n bit data in the form of p rows of n parallel bits each from the data composed of parallel rows of p bits held by the holding portion in accordance with the alignment mode discriminated by the discriminating portion, wherein the number p is smaller than the number n.

9. A communication control device for interfacing a data processing device with a communication network in which data is exchanged through signals representing DM (differential Manchester) codes, said communication control device comprising:
a converting circuit, operatively connected to said network, to receive a succession of DM codes and to output ER (edge representative) codes equivalent to said DM codes, each ER code having a pair of bits in order to establish a one-to-one correspondence between said DM codes and said ER codes;
a first parallelizing circuit, operatively connected to said converting circuit, to successively output said ER codes in the form of a succession of two parallel bits;
a second parallelizing circuit, operatively connected to said first parallelizing circuit and including two rows of serially connected storage devices each capable of storing one bit of information, one of said two parallel bits being successively passed through one of said rows and the other of said two parallel bits being successively passed through the other row;
a first SD (start delimiter) detecting circuit, operatively connected to a first subset of said storage devices of said second parallelizing circuit, to output a first SD detection signal when a bit pattern stored in said first subset coincides with a SD bit pattern which has been incorporated in data exchanged in said communication network for delimitation of said data;
a second SD detecting circuit, operatively connected to a second subset of said storage devices of said second parallelizing circuit, to output a second SD detection signal when a bit pattern stored in said second subset coincides with said SD bit pattern; and
a rearranging circuit, operatively connected to said second parallelizing circuit and said first and second SD detecting circuits, to output pairs of bits representing ER codes with reference to an SD detection signal outputted from said first or said second SD detection circuit, each pair consisting of two parallel bits and corresponding to one DM code.

10. The communication control device according to claim 9, further comprising:
a clock extracting circuit, operatively connected to said network, to generate a first and second clock signal which are synchronous with respect to DM codes incoming from said network, said converting circuit and said first parallelizing circuit operating in synchronism with said first clock signal, and said first and second SD detecting circuits and said rearranging circuit operating in synchronism with said second clock signal.

11. A network control device for receiving input data in the form of a train of serial bits from a communication network through a media interface in order to convert the input data into p-bit parallel signals by partitioning a serial bit train into respective successive p-bit signals in accordance with an order of reception and to generate clock signals in synchronism with the p-bit parallel signals, the network control device comprising:

p shift registers for receiving the p-bit parallel signals;

p selector circuits connected to said p shift registers for selecting a correspondence of respective p-bit parallel signals to respective registers of said p shift registers;

p detection circuits connected to said p shift registers for detecting whether a bit pattern extracted from each of said p shift registers agrees with a start delimiter which indicates a start point of an item contained in said input data;

a mode judgment circuit for determining an operating mode of said selector circuits;

a mode information holding circuit for holding mode information indicative of an operating mode of said selector circuits determined by said mode judgment circuit; and a counter circuit for generating signals partitioning n-bit data by dividing said clock signals;

said mode judgment circuit determining anew an operating mode of said selector circuits in accordance with mode information held in said mode information holding circuit and an output of one of said p detection circuits which detects that a bit pattern of a shift register matches said start delimiter;

said selector circuits performing shift input operations for said shift registers by aligning parallel bits in accordance with the operating mode determined by said mode judgment circuit.

12. A communication control device for receiving a train of serial bits and outputting n-bit parallel signals, the communication control device comprising:

a parallelizing circuit for receiving the train of serial bits at a reception frequency fr and for outputting p-bit parallel signals, the number p being smaller than the number n;

p shift registers connected to said parallelizing circuit for receiving the p-bit parallel signals at fr/p such that said p shift registers and respective bit positions of the p-bit parallel signals are in a one-to-one correspondence;

p start delimiter detection circuits connected to said p shift registers in order to output a detection signal when a bit pattern contained in each of said p shift registers agrees with a start delimiter; and a counter connected to said p start delimiter detection circuits in order to initiate generation of a timing signal at fr/n when a detection signal is output from one of said p start delimiter detection circuits, n-bit parallel signals being retrieved from said p shift registers in synchronism with the timing signal.

13. The device of claim 12 wherein said p shift registers are provided with a selector which changes the one-to-one correspondence between said p shift registers and respective bit positions of the p-bit parallel signals in accordance with which of said p start delimiter detection circuits detects the start delimiter.

14. The device of claim 12 wherein the number p is a power of 2.

* * * * *